United States Patent
Cuan et al.

(10) Patent No.: US 12,361,158 B2
(45) Date of Patent: **\*Jul. 15, 2025**

(54) COMPUTER-BASED SYSTEMS CONFIGURED FOR MANAGING PERMISSION MESSAGES IN A DATABASE AND METHODS OF USE THEREOF

(71) Applicant: Capital One Services, LLC, McLean, VA (US)

(72) Inventors: Lukiih Cuan, Washington, DC (US); Daniel Li, Markham (CA); Sruthi Kalpana Kattamuri, Herndon, VA (US); David D'Lima, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,417

(22) Filed: May 21, 2024

(65) Prior Publication Data

US 2024/0320362 A1    Sep. 26, 2024

Related U.S. Application Data

(63) Continuation of application No. 17/245,653, filed on Apr. 30, 2021, now Pat. No. 12,026,274.

(51) Int. Cl.
*G06F 21/62*    (2013.01)
*G06F 16/901*    (2019.01)

(52) U.S. Cl.
CPC ...... *G06F 21/6227* (2013.01); *G06F 16/9024* (2019.01); *G06F 2221/2103* (2013.01)

(58) Field of Classification Search
CPC ............ G06F 21/6227; G06F 16/9024; G06F 2221/2103; G06F 21/6218; G06F 21/604
See application file for complete search history.

(56) References Cited

U.S. PATENT DOCUMENTS

| | | | |
|---|---|---|---|
| 7,801,828 B2 | 9/2010 | Candella et al. | |
| 8,639,893 B2 * | 1/2014 | Ishitobi | G06F 40/10 711/156 |

(Continued)

FOREIGN PATENT DOCUMENTS

JP    2004046553 A    2/2004

*Primary Examiner* — David Garcia Cervetti
(74) *Attorney, Agent, or Firm* — Greenberg Traurig, LLP

(57) ABSTRACT

A method includes receiving a permission request from a user to perform an operation in a computer environment. Data elements of operations previously performed by a plurality of users are received. A set of operation types are generated by identifying data elements of operations previously performed by other users of the plurality of users having operation types performed by the user. The data elements in the set are mapped into a graph database. Permission messages are generated with a correct response identified from a data attribute from a specific operation type previously performed by the user, and wrong responses identified from the specific operation type previously performed by the other users. An accumulated probability based on the permission respond message is computed using the graph database. The user is tagged based on the accumulated probability as a permissioned user for performing the operation, or a non-permissioned violator user.

20 Claims, 11 Drawing Sheets

(56) References Cited

U.S. PATENT DOCUMENTS

| | | | |
|---|---|---|---|
| 9,152,775 B1 | 10/2015 | Kronrod | |
| 9,406,067 B1 | 8/2016 | Robinson | |
| 9,516,053 B1 | 12/2016 | Muddu | |
| 9,654,591 B2 * | 5/2017 | Matus | G06Q 50/01 |
| 9,692,764 B1 * | 6/2017 | Haila | G06F 16/245 |
| 9,699,196 B1 | 7/2017 | Kolman | |
| 9,699,485 B2 * | 7/2017 | Marlow | H04N 21/41265 |
| 9,785,401 B2 | 10/2017 | Yuen | |
| 9,786,294 B1 | 10/2017 | Bezos | |
| 9,870,630 B2 | 4/2018 | Patil | |
| 10,606,991 B2 | 3/2020 | Brison | |
| 10,671,752 B1 | 6/2020 | Misra | |
| 10,673,880 B1 | 6/2020 | Pratt | |
| 10,684,942 B2 | 6/2020 | Dermer | |
| 10,692,083 B2 * | 6/2020 | Todasco | H04M 3/42059 |
| 10,791,121 B1 * | 9/2020 | Jakobsson | G06F 21/00 |
| 10,812,500 B2 | 10/2020 | Rao | |
| 10,885,114 B2 | 1/2021 | Mullins | |
| 10,904,270 B2 | 1/2021 | Muddu | |
| 11,122,038 B1 | 9/2021 | Schuster | |
| 11,170,124 B2 | 11/2021 | Misra | |
| 11,487,513 B1 * | 11/2022 | Hanson | G06F 8/71 |
| 11,645,412 B2 | 5/2023 | Misra | |
| 11,663,354 B1 | 5/2023 | Nanda | |
| 11,681,729 B2 | 6/2023 | Gerhardt | |
| 11,783,243 B2 | 10/2023 | Lu | |
| 11,783,272 B2 | 10/2023 | Olenoski | |
| 2005/0246278 A1 | 11/2005 | Gerber | |
| 2006/0080525 A1 | 4/2006 | Ritter | |
| 2007/0092114 A1 | 4/2007 | Ritter | |
| 2009/0183231 A1 * | 7/2009 | Jin | G06F 21/32 726/2 |
| 2011/0276396 A1 | 11/2011 | Rathod | |
| 2012/0065245 A1 | 3/2012 | Baltimore | |
| 2013/0151453 A1 | 6/2013 | Bhanot | |
| 2013/0318580 A1 | 11/2013 | Gudlavenkatasiva | |
| 2014/0358535 A1 | 12/2014 | Lee | |
| 2015/0026264 A1 | 1/2015 | McDonald | |
| 2015/0026796 A1 | 1/2015 | Alan | |
| 2015/0127628 A1 | 5/2015 | Rathod | |
| 2015/0199444 A1 | 7/2015 | Agashe | |
| 2015/0293965 A1 | 10/2015 | Gullin | |
| 2016/0149919 A1 | 5/2016 | Gauthier | |
| 2016/0225374 A1 | 8/2016 | Rodriguez | |
| 2017/0084273 A1 | 3/2017 | Zohar | |
| 2017/0134434 A1 * | 5/2017 | Allen | H04L 63/105 |
| 2017/0345003 A1 * | 11/2017 | Spears | H04L 63/102 |
| 2018/0039775 A1 | 2/2018 | Poiesz | |
| 2018/0052884 A1 | 2/2018 | Kale | |
| 2018/0137424 A1 | 5/2018 | Gabaldon | |
| 2018/0336364 A1 * | 11/2018 | Haila | G06F 21/6227 |
| 2019/0036966 A1 * | 1/2019 | Lin | H04L 63/20 |
| 2019/0114643 A1 * | 4/2019 | Dewitt | G06Q 20/3226 |
| 2019/0294976 A1 * | 9/2019 | Vangala | G06F 16/9024 |
| 2019/0305960 A1 * | 10/2019 | Szollosi | H04L 9/0866 |
| 2019/0384926 A1 * | 12/2019 | Wu | G06F 21/6218 |
| 2020/0051127 A1 | 2/2020 | Johnson | |
| 2020/0053121 A1 | 2/2020 | Wilcox | |
| 2020/0065459 A1 | 2/2020 | Himabindu | |
| 2020/0074338 A1 | 3/2020 | Florentino | |
| 2020/0097601 A1 * | 3/2020 | Han | G06F 16/36 |
| 2020/0167785 A1 | 5/2020 | Kursun | |
| 2022/0121771 A1 | 4/2022 | Misra | |
| 2022/0131844 A1 | 4/2022 | Sherlock | |
| 2022/0188389 A1 * | 6/2022 | Benkreira | G06F 21/40 |
| 2022/0245157 A1 * | 8/2022 | Russell | G06F 16/288 |
| 2022/0284082 A1 | 9/2022 | Liu | |
| 2022/0350917 A1 | 11/2022 | Cuan | |
| 2022/0351142 A1 | 11/2022 | McGarr | |
| 2022/0358666 A1 | 12/2022 | Parks | |
| 2022/0400130 A1 | 12/2022 | Kapoor | |
| 2023/0004972 A1 | 1/2023 | Rapowitz | |
| 2023/0012250 A1 | 1/2023 | Miller | |
| 2023/0053675 A1 | 2/2023 | Edwards | |
| 2023/0098536 A1 | 3/2023 | Zheng | |
| 2023/0153646 A1 | 5/2023 | Ploennigs | |
| 2023/0205913 A1 | 6/2023 | Nanda | |
| 2023/0216887 A1 | 7/2023 | Stong | |
| 2024/0086284 A1 * | 3/2024 | Warwick | H04L 63/145 |

\* cited by examiner

COMPUTER-BASED SYSTEMS CONFIGURED FOR MANAGING PERMISSION MESSAGES IN A DATABASE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of managing permission messages in a database.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of receiving, by a processor, from a computing device associated with a user from a plurality of users, a permission request of the user to perform at least one operation within a computer environment associated with an entity. A plurality of data elements of operations that have been previously performed by the plurality of users on computing devices in a plurality of computer environments may be received. A subset of data elements in the plurality of data elements of the operations that have been previously performed by at least one other user from the plurality of users may be identified based at least in part on at least one operation type of user-related operations performed by the user. A set of operation types based on the subset of data elements may be generated. The subset of data elements may be mapped into a graph database. The graph database may include a plurality of operation-type centric nodes and a plurality of edges connecting between the plurality of operation-type centric nodes. Each operation-type centric node may include at least one data attribute of data elements having the at least one operation type performed by the user or the at least one other user. Each edge from the plurality of edges may represent a probability that the user previously performed operations for any of the at least one operation type associated with the at least one data attribute between adjacent operation-type centric nodes. A plurality of permission messages transmitted to the computing device associated with the user may be generated. Each permission message may include:

(i) a correct response identified from a data attribute from at least one data element of a specific operation type from the at least one operation type previously performed by the user, and (ii) at least one wrong response identified from data attributes from the at least one data element of the specific operation type from the at least one operation type previously performed by the at least one other user.

A permission respond message from the computing device of the user may be received in response to presenting a permission message of the plurality of permission messages to the user. An accumulated probability that is representative of the path along the plurality of edges between operation-type centric nodes having the at least one data attribute may be computed based on the permission respond message and the probability between each of the adjacent operation-type centric nodes along a path on the graph database. An electronic representation of the user in the computer environment associated with the entity may be tagged as:

(i) a permissioned user for performing the at least one operation in the computer environment when the accumulated probability is higher than a predefined threshold, or (ii) a non-permissioned violator user when the accumulated probability is below the predefined threshold.

In some embodiments, the present disclosure provides an exemplary technically improved computer-based apparatus that includes at least the following components of a server. The server may include a memory and a processor. The processor may be configured to execute computer code stored in the memory that causes the processor to receive, from a computing device associated with a user from a plurality of users, a permission request of the user to perform at least one operation within a computer environment associated with an entity, to receive a plurality of data elements of operations that have been previously performed by the plurality of users on computing devices in a plurality of computer environments, to identify a subset of data elements in the plurality of data elements of the operations that have been previously performed by at least one other user from the plurality of users based at least in part on at least one operation type of user-related operations performed by the user, to generate a set of operation types based on the subset of data elements, to map the subset of data elements into a graph database, where the graph database may include a plurality of operation-type centric nodes and a plurality of edges connecting between the plurality of operation-type centric nodes, where each operation-type centric node may include at least one data attribute of data elements having the at least one operation type performed by the user or the at least one other user, where each edge from the plurality of edges represents a probability that the user previously performed operations for any of the at least one operation type associated with the at least one data attribute between adjacent operation-type centric nodes, to generate a plurality of permission messages transmitted to the computing device associated with the user, where each permission message may include:

(i) a correct response identified from a data attribute from at least one data element of a specific operation type from the at least one operation type previously performed by the user, and (ii) at least one wrong response identified from data attributes from the at least one data element of the specific operation type from the at least one operation type previously performed by the at least other user, to receive a permission respond message from the computing device of the user in response to presenting a permission message of the plurality of permission messages to the user, to compute, based on the permission respond message and the probability between each of the adjacent operation-type centric nodes along a path on the graph database, an accumulated probability that is representative of the path along the plurality of edges between operation-type centric nodes having the at least one data attribute, and to tag an electronic representation of the user in the computer environment associated with the entity as:
  (i) a permissioned user for performing the at least one operation in the computer environment when the accumulated probability is higher than a predefined threshold, or
  (ii) a non-permissioned violator user when the accumulated probability is below the predefined threshold.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
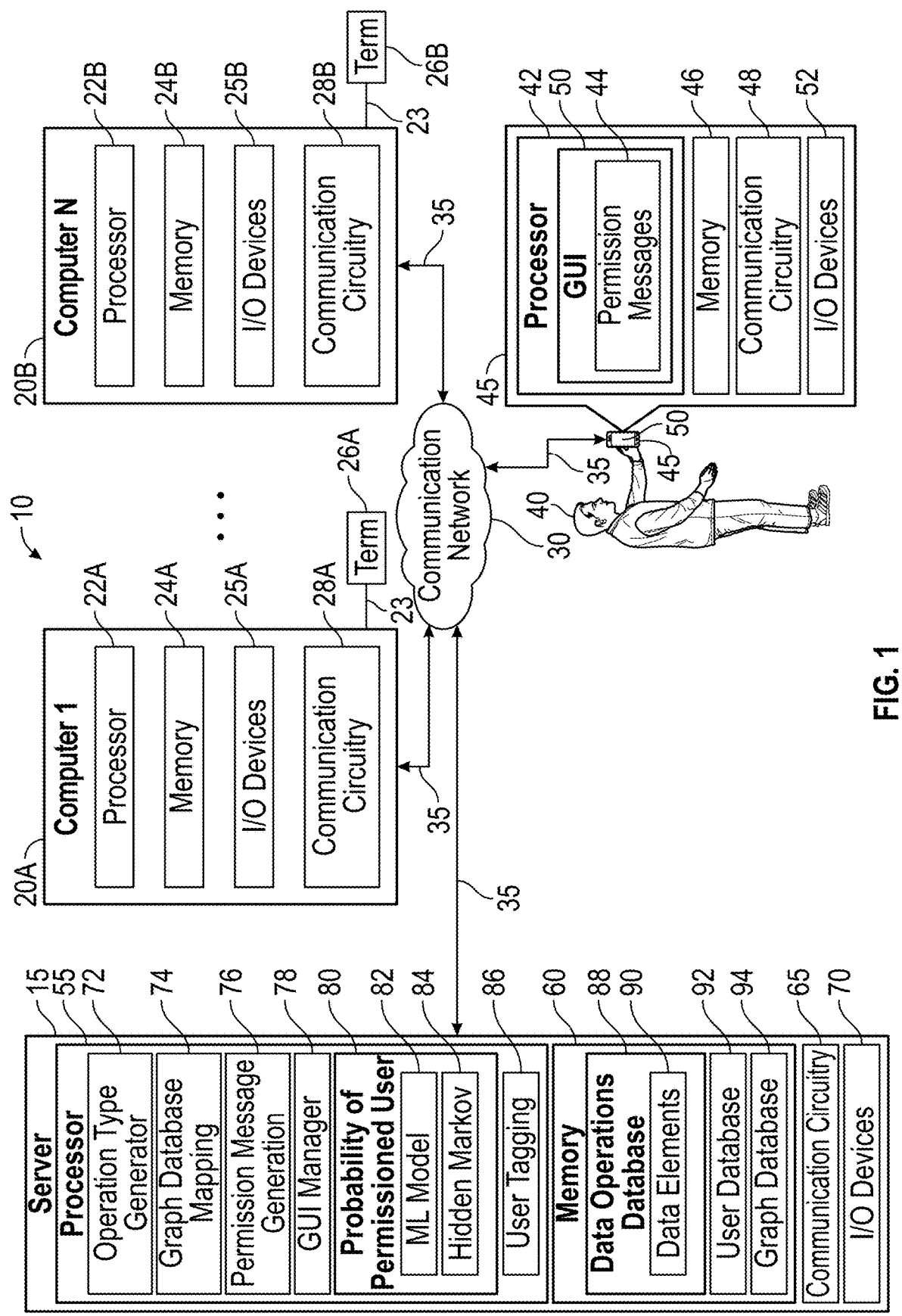
FIG. 1 is a block diagram of a system for managing permission messages in a database in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe a method and system for managing permission messages in a database. When a user from a plurality of users wishes to perform at least one operation within a computer environment associated with an entity, a server granting permission access to the user may receive a permission request from the user to perform the at least one operation of at least one specific operation type. The server may authenticate and/or verify the identity of the user by generating a plurality of permission messages with authentication questions for the user to answer. However, to ensure that the identity of the user requesting permission is a real user and not a fraudster, the authentication questions may include a right answer known only to the user and specifically crafted wrong answers to fool the fraudster as generated by the techniques described hereinbelow.

In some embodiments, the server may receive a plurality of data elements of operations previously performed by the plurality of users on computing devices in a plurality of computer environments. The server may identify a subset of data elements in the plurality of data elements of the operations that have been previously performed by at least one other user from the plurality of users based at least in part on at least one operation type of user-related operations performed by the user. The server may generate a set of operation types based on the subset of data elements.

In some embodiments, a correct answer presented in a permission message may be generated from data attributes of data elements of operations of the at least one specific operation type previously performed by the user. Similarly, the wrong answers may be generated by data attributes of the data elements of operations previously performed by the at least one other user having the at least one specific operation type of user-related operations performed by the user. In this manner, the right answer and the wrong answers presented to a user are extremely similar since they are based on the at least one specific operation type performed by the user as well as the at least one other user that will be shown hereinbelow.

In some embodiments, the identified data elements in the subset may be mapped into a graph database. Machine learning techniques such as a Hidden Markov process, for example, may be applied to the graph database to compute an accumulated probability based on the permission respond message for each permission message in the plurality of permission messages presented to the user. The accumulated probability may be used to distinguish whether the user is a real user (e.g., a permissioned user) that may be granted permission access to perform the at least one operation in a computer environment associated with the entity, or a fraudster (e.g., a non-permissioned violator user) that is denied permission access.

In some embodiments, the server for granting permission access to the user may be associated with an authorizing entity. The user may use a unique authorization identifier issued by the authorization entity to perform the at least one operation in the computer environment associated with the entity.

FIG. 1 is a block diagram of a system 10 for managing permission messages in a database in accordance with one or more embodiments of the present disclosure. System 10 may include a server 15, N computers such as a Computer1 20A, . . . and a ComputerN 20B, and a computing device 45 associated with a user 40. The server 15, the N computers where N is an integer and the computing device 45 may each communicate over a communication system 30. In some embodiments, the server 15 may be associated with an authorizing entity and the N computers may be associated with N entities. In other embodiments, the server 15 and the N computers may be associated with a single entity. Nevertheless, the server 15 and the N computers such as Computer 1 20A . . . Computer N 20B may be referred herein to as a computer environment.

In some embodiments, the server 15 may include a processor 55, a memory 60, a communication circuitry 65 for enabling the server 15 to communicate 35 over the communication network, and I/O devices 70 that may include a display, a keyboard, a mouse and other computer peripherals (not shown) that may be used by the user 40.

In some embodiments, the processor 55 may be configured to execute software modules (e.g., computer code) stored in the memory 60. The software modules may include an operation type generator module 72, a graph database mapping module 74, a permission message generation module 76, a graphic user interface (GUI) manager module 78, a probability of permissioned user module 80 that may use a machine learning (ML) model 82 and/or a Hidden Markov model 84, and a user tagging module 86.

In some embodiments, the memory 60 may store a data operations database 88 that may include data elements 90, a user database 92, and a graph database 94.

In some embodiments, each of the N computers shown in FIG. 1 as the Computer 1 20A . . . the Computer N 20B may each respectively include a processor 22A and a processor 22B, a memory 24A and a memory 24B, input/output (I/O) devices 25A and input/output (I/O) devices 25B, and communication circuitry 28A and 28B for communicating 35 over the communication network 30. Computer 1 20A . . . Computer N 20B may be coupled to and/or communicate 23 with at least one computing terminal TERM 26A and at least one computing terminal TERM 26B. In some embodiments, a permission request from the user to perform operations in the computer environment may be initiated through any one at the at least one computing terminals coupled 23 to the N computing devices.

In some embodiments, a computing device 45 associated with a user 40 may communicate 35 over the communication network 30 with the server 15, and/or the Computer1 20A . . . the ComputerN 20B through a graphic user interface 50.

In some embodiments, computing device 45 as shown in the inset may include a processor 42, a memory 46, communication circuitry 48, and input/output (I/O) devices 52. The processor 42 may display permissions messages 44 on the GUI 50. The permission messages 44 displayed on the GUI 50 may be remotely managed over the communication network 30 by the GUI Manager module 78 on the server 15.

In some embodiments, a user may request permission to perform operations in the server 15 and/or in any of the N computers (e.g., shown as Computers 20A and 20B) may communicate through the at least one computing device 45, and/or any of the at least one terminals TERM 26A . . . TERM 26B.

In some embodiments, the at least one computing device 45 associated with the user 40 is shown in FIG. 1 as a smartphone, but it may also be a tablet, personal computer, and/or laptop, for example.

In some embodiments, the user may perform operations directly on the server 15 such as through the I/O devices 70. The system 10 shown in FIG. 1 may be used in a variety of exemplary embodiments (e.g., use-cases) as described hereinbelow. However, what is common to the exemplary embodiments is that the server 15 may grant permission assess to the user 40 after verifying the user 40 by the methods described herein. For example, the user may wish to perform operations on the server 15 through any suitable I/O device 70 coupled to the server 15. In this exemplary case, the server 15 may grant permission directly to the user. In other embodiments, the user may wish to perform operations in at least one computer associated with at least one entity, but the permission access to do so may be granted to the user to perform operations by the server 15 associated with an authorizing entity as described hereinbelow.

In some embodiments, the plurality of data operations previously performed by the plurality of users in the computer environment associated with the entity may be operations performed in a distributed data center of a computer environment of a corporation, for example. The user may be an employee of the corporation. The user may need to perform a specific operation based on a variety of tasks for maintaining a plurality of computers each with a computing terminal, for example, (e.g., TERM 26A of Computer 1 . . . . TERM 26B of Computer N) at multiple locations of the corporation that communicate over the communication network 30. The variety of tasks may include, for example, infrastructure operations for maintaining server, storage and network resources, security tasks, and management tasks for monitoring of policies and procedures within data center processes on each of these computers.

In some embodiments, the server 15 associated with the authorizing entity may be managed by a security division of the corporation that may challenge the user upon logging using a login/password (unique authorization identifier) into the at least one computing terminal 26A with authentication questions related to previous operational tasks the user previously performed and wrong answers may be taken from operational tasks performed by other employees of the corporation.

In some embodiments, the entity may be a merchant or a business. The Computer1 20A . . . the ComputerN 20B may be associated with N different merchants or businesses, for example. The server 15 may be associated with an authorizing entity such as a financial institution. The user may be a customer of the financial institution and may wish to perform operations such as a purchase transaction of a specific item or service, for example, at a point of sale (POS) terminal of one of the entities. Thus, each computer (e.g., Computer 1 20A . . . Computer N 20B) in FIG. 1, for example, may be a server associated with a distinct business or merchant, and the server 15 associated by the financial institution may authorize operations for the user to use a unique authorization identifier (e.g., payment card number) in the server of the distinct business or merchant. In this case, the computer environment may include the server associated with the distinct business or merchant.

When the user uses a payment card (e.g., debit or credit card) with a payment card number (e.g., unique authorization identifier) issued by the financial institution at the POS terminal or online website associated with the entity, the user may receive permission messages from the server of the financial institution with authentication questions on a computing device associated with the user, such as on the GUI 50 of a smartphone 45, for example, to authenticate the identity of the person using the payment card. An electronic representation of the user in the computer environment may be tagged based on the permission respond messages as either the real payment card account owner (e.g., permissioned user) or a fraudster (e.g., non-permissioned violator user).

In some embodiments, the server 15 may use the operation type generator module 72 to identify data elements of operations (e.g., purchase transactions) of the user 40 of a specific operation (e.g., transaction) type such as a restaurant, coffee shop, department store, for example. The permission message generation module 76 may generate authentication question with correct answers from previous payment cards transactions performed by the user of a specific transaction type as identified in the data elements 90 associated with the user. The permission message generation module 76 may generate authentication questions with wrong answers from payment cards transactions of the same specific operation type as that of the user, but previously performed by the at least one other user for fooling a fraudster.

In some embodiments, the user may try to perform operations in an account of the user at the financial institution, such a banking account, through an online website or by calling into a call center of the financial institution. In this exemplary scenario, the user 40 may be interacting with the server 15 of the financial institution through the computing device 45. Thus, the server 15 may generate authentication questions in permission messages based on previous account operations performed by the user (e.g., bank account withdrawals, deposits, and/or transfers) or may use payment card transactions for payment cards of user issued the same financial institution as the banking account, for example.

The processor 55 may need to analyze terabytes of data in the data elements 90 in the data operations database 88 and/or the user database 92 so as to generate permission messages that can reliably distinguish between a real user and a fraudster attempting access using the unique authorization identifier.

The system and methods for managing permission messages presented to a user with authentication questions generated in this manner as disclosed herein provide an improvement to computer authentication and security technologies. A graph database mapping module 74 may be used to map and populate nodes of a graph database using data attributes of the data elements 90, consequently reducing the otherwise required use of computing resources. Machine learning models, such as Hidden Markov models, may be applied to different paths on the graph database as the user responds to each of the permission messages presented so as to compute an overall probability based on the permission message responses to distinguish whether the user is a real user or a fraudster attempting to use the unique authorization identifier of the real user to perform operations in the computer environment, consequently reducing the otherwise required use of computing resources to verify the user's identify.

Figure 2:
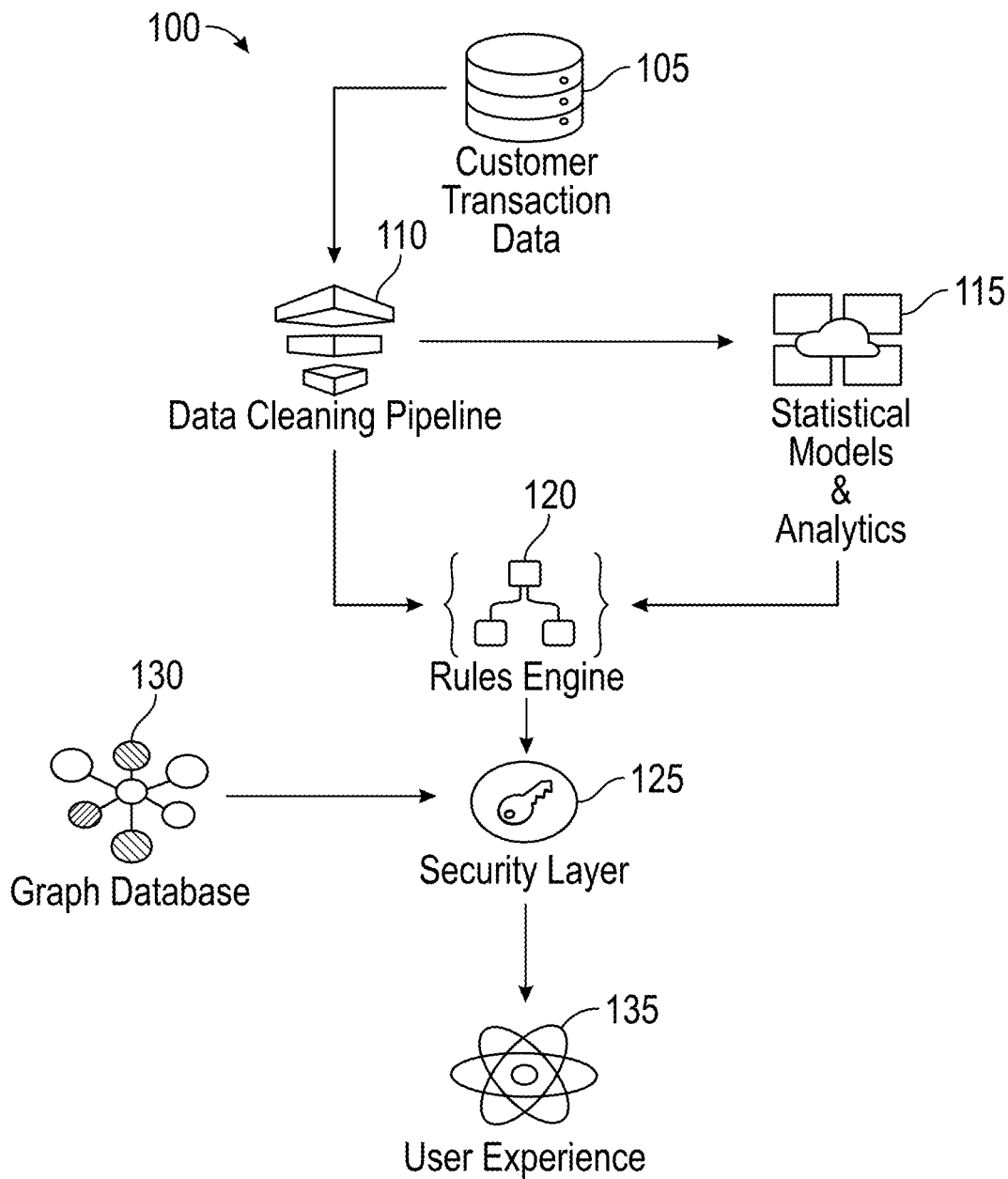
FIG. 2 is a flow diagram of a system for managing permission messages in a database in accordance with one or more embodiments of the present disclosure.

FIG. 2 is a flow diagram 100 of the system 10 for managing permission messages in a database in accordance with one or more embodiments of the present disclosure. In the flow diagram 100, the processor 555 may use a data cleaning pipeline 110 with similar functionality of the operation type generator module 72 of FIG. 1 to identify data elements 90 with the customer transaction data 105 in the data operation database 88 having a specific operation type related to previous transactions performed by the user from a plurality of users in the user database 92 and previous transactions performed by the at least one other user from the plurality of users in the user database 92.

In some embodiments, identifying data elements 90 with the customer transaction data 105 in the data operation database 88 may occur within a predefined historical time interval such as an hour, a day, a week, a month, or a three-month historical time interval, for example.

In some embodiments, the operation type generator module 72 may identify data elements 90 within the customer transaction data 105 in the data operation database 88 having transaction data types based on age group, merchant category codes (MCC), merchant and/or customer location, similar spending patterns based on demographics, and/or any combination thereof.

In some embodiments, data attributes of identified data elements in the subset of data elements of the operations that have been previously performed by the at least one other user from the plurality of users and/or the user may be identified by the data cleaning pipeline 110, and may be used to populate the operation-type centric nodes in a graph database 130. A statistical models and analytics block 115 may input the identified data elements 90 having distinct operational types to machine learning models so as to compute a probability that a specific user from the plurality of users has performed the transactions in the populated graph database 130. These probabilities may be associated with a plurality of edges of the graph database 130.

In some embodiments, when a user provides answers in permission respond messages to questions displayed on the computing device 45 in permission messages to the user 40, for example, the answers may map a response path along the nodes of the graph database. The probabilities associated with the edges between those nodes along the response path may be used to generate an overall accumulated probability to assess if the user is a real user that may be permissioned for performing operations in the computer environment of an entity or a fraudster, also known herein as a non-permission violator user that is prevented from performing the operations in the computer environment of the entity.

In some embodiments, a rules engine 120 in the permission message generation module 76 may be used to generate the authentication questions for use in the plurality of permission messages taken from the data stored in the operation-type centric nodes of the graph database 130 for providing a user experience 135 to the user.

In some embodiments, if the functionality of the flow diagram 100 is bundled into an application that would interface with a phone or internet-facing application, a security layer 125 may be needed to provide additional security.

Figure 3A:
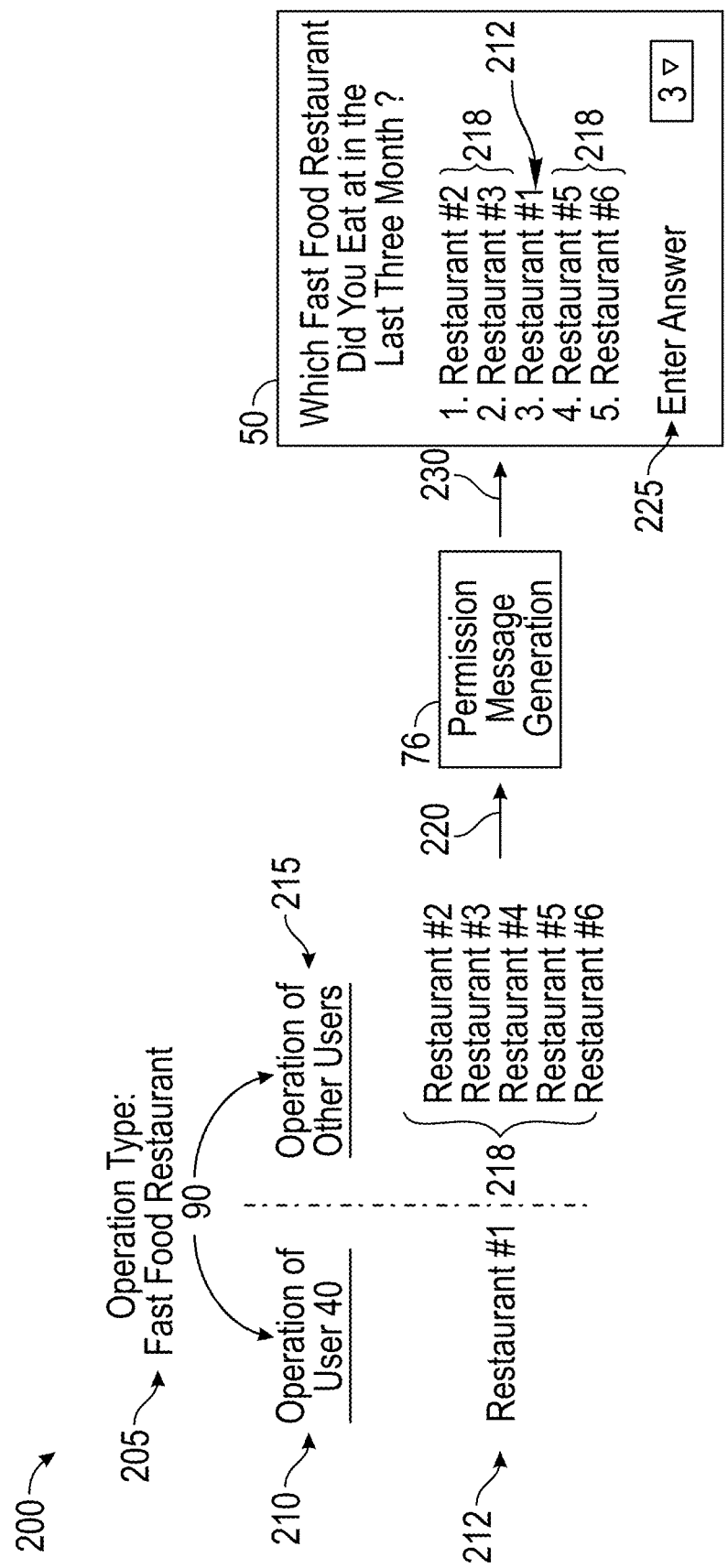
FIGS. 3A and 3B illustrate a generation of exemplary permission messages based on data elements of distinct operation types in accordance with one or more embodiments of the present disclosure.
Figure 3B:
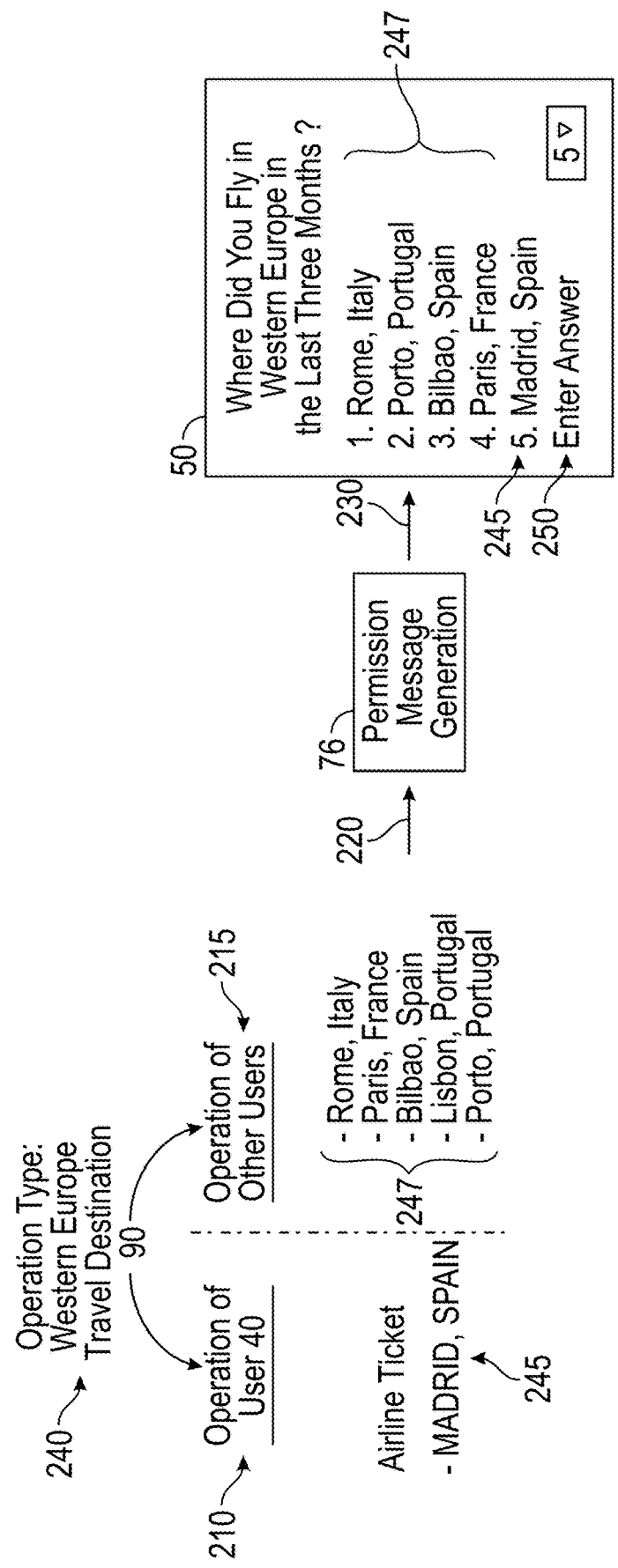

FIGS. 3A and 3B illustrate a generation of exemplary permission messages 44 based on data elements of distinct operation types in accordance with one or more embodiments of the present disclosure.

FIG. 3A illustrates a flow 200 for generating exemplary permission messages 44 based on data elements 90 from the data operations database 88 based on an operation type of fast food restaurants 205. The data elements 90 for the operation type of fast food restaurants 205, such as payment card transactions from fast food restaurants, may be identified by the operation type generator module 72 from operations for the user 40 having a data attribute 212 such as Restaurant #1, and operations of other users 215 at fast food restaurants having data attributes 218 such as Restaurant #2, Restaurant #3, Restaurant #4, Restaurant #5, and Restaurant #6.

In some embodiments, the data attribute of the user 212 and the data attributes of the other users 218 for fast food restaurant payment card transaction operations may be inputted 220 to the permission message generation module 76 which outputs 230 a generated permission message.

In some embodiments, the outputted permission message may be displayed on GUI 50 of the computing device 45 associated with the user 40, for example. The outputted permission message in GUI 50 may include an authentication question "Which Fast Food Restaurant Did You Eat at in the Last Three Months?" where the correct answer may be based on the data attribute of the user 212 and the wrong answers may be based on the data attributes of the other users 218.

In some embodiments, the user 40 may enter an answer, or a permission respond message, in response to the authentication question in the permission message through a pull-down menu 225, for example, selecting an answer number 1-5 as shown in FIG. 3A. The wrong answers 218 are so categorically identical to the correct answer 212 that a real user will remember going to Restaurant #1, but a fraudster will not know the correct answer and may be forced to guess.

FIG. 3B illustrates a flow for generating exemplary permission messages 44 exemplary permission messages based on data elements 90 from the data operations database 88 based on an operation type of Western Europe Travel Destination 240. The data elements 90 for the operation type of Western Europe Travel Destination 240, such as payment card transactions from airline ticketing offices and/or travel agencies indication Western Europe Travel Destinations 240 may be identified by the operation type generator module 72 from operations for the user 40 having a data attribute 245 such as an Airline Ticket purchase to Madrid, Spain and operations of other users 215 of Western Europe Travel Destinations 240 having data attributes 247 such as Rome, Italy; Paris, France; Bilbao, Spain; Lisbon, Portugal; and Porto, Portugal.

In some embodiments, the data attribute of the user 245 and the data attributes of the other users 247 for payment card transaction operations having Western Europe Travel Destinations may be inputted 220 to the permission message generation module 76 which outputs 230 a generated permission message.

In some embodiments, the outputted permission message may be displayed on GUI 50 of the computing device 45 associated with the user 40, for example. The outputted permission message in GUI 50 may include an authentication question "Where Did You Fly in Western Europe in the Last Three Months?" where the correct answer may be based on the data attribute of the user 245 and the wrong answers may be based on the data attributes of the other users 247.

In some embodiments, the user 40 may enter an answer, or a permission respond message, in response to the authentication question in the permission message through a pull-down menu 250 selecting an answer number 1-5 as shown in the FIG. 3B. The wrong answers 247 are so categorically identical to the correct answer 245 that a real user will remember going to Madrid, Spain but a fraudster will not know the correct answer and may be forced to guess. Thus, providing successive authentication questions in a plurality of permission messages presented to the user on GUI 50 in this manner, as shown in FIGS. 3A and 3B, increases the likelihood that a fraudster may select one or more wrong answers.

In some embodiments, the operation type generator module 72 may generate at least one set of a plurality of operation types (e.g., fast food restaurant 205 and Western Europe Travel Destinations 240) from the plurality of data elements 90 previously performed by the other users 215 having at least one operation type performed by the user 40. The permission message generator module 76 may generate a plurality of permission messages 44 transmitted to the GUI 50 of the computing device 45 associated with the user 40. Each permission message may include (i) a correct response identified from the data attribute (e.g., data attribute 212, data attribute 245) from the at least one data element of a specific operation type (e.g., operation type 205, operation type 240) from the at least one operation type previously performed by the user 40, and (ii) at least one wrong response (e.g., attributes 218, attributes 247) identified from data attributes from the at least one data element of the specific operation type from the at least one operation type (e.g., operation type 205, operation type 240) previously performed by the other users 215.

The systems and methods described herein uses the computing device 45 configured to present authentication questions to the user 40 through the permission messages 44 with correct answers and wrong answers generated from data attributes from data elements of the same operation type. For example, suppose that a real user likes to go to a specific fast food restaurant identified from the payment card transactions of the real user. The unverified user may attempt to perform an operation on the computing device 45 using a unique authentication identifier (e.g., payment card number, login/password) of the real user. The user 40, which is unverified, may be presented with permission messages 44 on the GUI 50 asking the user 40 to choose the specific fast food restaurant that the real user likes from a list of possible answers as shown in FIG. 3A. The real user will identify the preferred, specific fast food restaurant in a list of possible answers. A fraudster may not know the preferred, specific fast food restaurant known only to the real user and may view similar fast food restaurants in the list of answers, which may force the fraudster to guess an answer, most likely a wrong answer. Thus, the processor 55 choosing wrong answers from transaction (operation) data elements from previous transactions of the at least one other user from the plurality of user may be used to better filter a fraudster from the real user.

In some embodiments, the operation may be, for example, a funds transfer out of the account of the real user held in a financial institution where the server 15 may be associated with the financial institution. The account of the real user may be held in the financial institution. GUI Manager 78 may send digital instructions to the GUI 50 over the communication network 30 to display permission messages 44 on the GUI 50 to verify the user 40.

In some embodiments, the operation may be an attempt to purchase items at a store location using a payment card of the real user at the terminal 26A, for example, of an entity such as a merchant or a business. The Computer1 20A may then communicate the operation attempt in a permission request by the user 40 to the server 15. GUI Manager 78 may send digital instructions to the GUI 50 over the communication network 30 to display permission messages 44 on the GUI 50 to verify the user 40.

Figure 4:
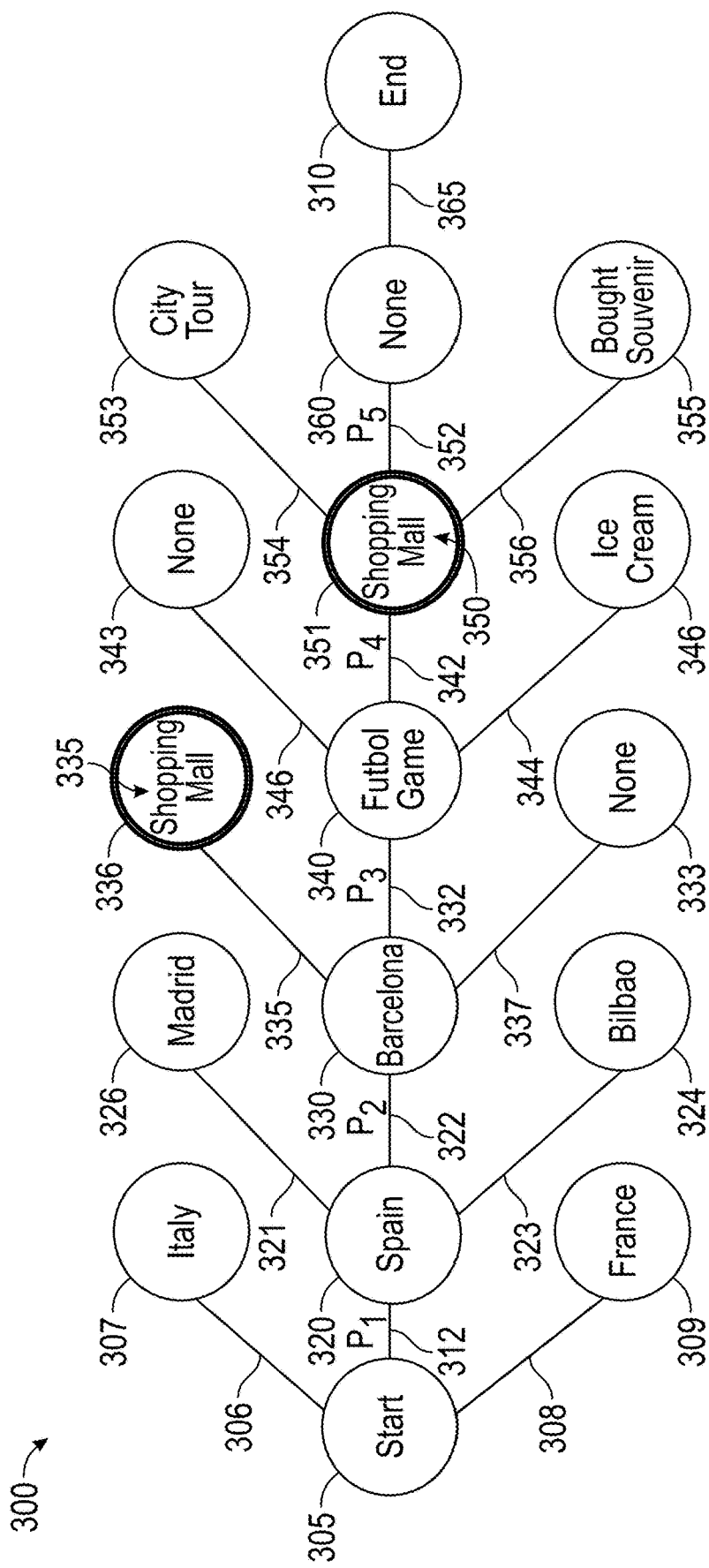
FIG. 4 illustrates an exemplary graph database in accordance with one or more embodiments of the present invention.

FIG. 4 illustrates an exemplary graph database 300 in accordance with one or more embodiments of the present invention. The graph database 300 may be stored in the memory 60 (e.g., as the graph database 94). Once the operation type generator module 72 generates at least one set of operation types from data elements 90 by identifying data elements 90 in the data operations database 88 previously performed by the at least one other user of the plurality of users having at least one operation type performed by the user as shown in FIGS. 3A and 3B, for example, the graph database mapping module 74 may map the data elements 90 in the at least one set into the graph database 300.

In some embodiments, the graph database 300 may include a plurality of operation-type centric nodes and a plurality of edges connecting between the plurality of operation-type centric nodes. Each operation-type centric node may include at least one data attribute of data elements having the at least one operation type performed by the user or the at least one other user. Each edge from the plurality of edges may represent a probability that the user previously performed operations for any of the at least one operation type associated with the at least one data attribute between adjacent operation-type centric nodes.

The exemplary embodiment shown in FIG. 4 illustrates the graph database 300 with a plurality of operation-type centric nodes such as a node 305 with a data attribute of "Start", a node 320 with a data attribute of "Spain", a node 330 with a data attribute of "Barcelona", a node 340 with a data attribute of "Futbol Game", a node 350 with a data attribute of "Shopping Mall", a node 360 with a data attribute of "None", a node 310 with a data attribute of "End", a node 307 with a data attribute of "Italy", a node 326 with a data attribute of "Madrid", a node 335 with a data attribute of "Shopping Mall", a node 343 with a data attribute of "None", a node 353 with a data attribute of "City Tour", a node 309 with a data attribute of "France", a node 324 with a data attribute of "Bilbao", a node 333 with a data attribute of "None", a node 346 with a data attribute of "Ice Cream", and a node 335 with a data attribute "Bought Souvenir".

The exemplary embodiment shown in FIG. 4 illustrates the graph database 300 with a plurality of edges connecting between the plurality of operation-type centric nodes such an edge 312, an edge 322, and edge 332, an edge 342, an edge 352, an edge 365, an edge 308, an edge 323, and edge 337, an edge 344, an edge 356, an edge 306, an edge 321, and edge 335, an edge 346, and an edge 354.

For the graph database 300 shown in FIG. 4, a set of four permission messages may be successively displayed on GUI 50 to the user 40 as follows: 1. Where in Western Europe did you fly? Italy (node 307), Spain (node 320), or France (node 309). (Spain correct answer). 2. What town in Spain did you fly to? Madrid, Barcelona, Bilbao. (Barcelona is correct answer). 3. What is the first thing that you did in Barcelona? Futbol Game, or a shopping mall. (Futbol game is the correct answer) 4. What did you do after the Futbol Game? Shopping mall, Bought Souvenir, City tour (Shopping mall is the correct answer).

Accordingly, the set of plurality of operation types associated with these four questions may be: Western European Country destinations, Spain City destinations, a first set of activities that the real user did in Barcelona, and a second set of activities that the real user did in Barcelona. Note that there may be a time sequence that may be identified in the operations which may be used to distinguish between a fraudster and the real user (e.g., the order of acceptable states may be used to filter a fraudster). For example, date and time stamps on the payment card transaction data may be used to identify a temporal sequence where the real user first went to a Futbol game and then went to a shopping mall. Thus, the shopping mall nodes have highlighted lines 336 and 351 in FIG. 4 to indicate that they are the same data attribute of activities performed at different times.

The path from the start node 305, to the node 320, to the node 330 to the node 340 to the node 350 to the node 360 to the end node 310 is the path of the user 40 giving correct answers to authentication messages to authenticate an unverified user as the real user in this exemplary embodiment. This path on graph database 300 is referred to herein as the "correct path". These correct answers may be taken from data attributes associated with payment card transaction data associated with the real user. Similarly, the nodes above and below this path are wrong answers that may be taken from data attributes associated with payment card transaction data associated with the at least one other user.

Each edge may have an associated probability that the user performed the operation represented by the data attributes in two particular nodes connected by a particular edge. For example, the edge 312 may have a probability denoted $P_1$ between nodes 305 and 320 (acceptable state), and similarly for probabilities $P_2$, $P_3$, $P_4$, and $P_5$. However, the edge 321 from the node 320 to the node 326 with data attributes taken from the at least one other user. Thus, the edge 321 between unacceptable states will have a very low probability (not shown) indicative of transactions not performed by the real user. Thus, the probability of edges taken along the path between two acceptable states may be very high. However, any path along an unacceptable may cause the overall probability to drop significantly. Each movement transitioning between two different nodes on the graph database is a result of a permission respond message given by the unverified user to an authentication question in a permission message.

Note that the graph database 300 shows a portion of the complete graph database with the correct path based on correct answers to be given by a real user along with one pair of wrong answer nodes for each correct answer node. The complete database (not shown for brevity) would include additional paths of answers gleaned from the data elements 90 of the data operations database 88. Thus, if the unverified user gives a wrong answer such as along the edge 321 from the node 320 to the node 326. The complete graph database would include additional nodes off the correct path that may be connected, for example, to the node 326 to account for additional answers that the unverified user may provide in the permission response message. Suppose the unverified user gave a wrong answer as Madrid in the node 326, node 26 may have another node (not shown) with the data attribute "Futbol Game" as in the node 340 along the correct path. Thus, as the unverified user provides answers to a set of authentication questions in the permission messages 44, the path along edges on the graph database may diverge from the edges along the correct path and may move along additional overall paths based on the unverified user responses with each edge having an associated probability.

In some embodiments, the probability of permissioned user module 80 may compute an accumulated probability representative of a path along the plurality of edges between operation-type centric nodes with the at least one data attribute based on the permission respond message received from the computing device associated with the user, using the probability between each of the adjacent operation-type centric nodes along the path on the graph database. For example, along the correct path with probabilities $P_1$-$P_5$ as shown, the accumulated probability may be, for example, given by the product of the probabilities along the correct path (e.g. $P_1*P_2*P_3*P_4*P_5$). However, generally a path between N nodes for N permission respond messages from the unverified user, the accumulation probability $P_A$ may be given by $P_A=P_1*P_2*\ldots*P_N$.

In some embodiments, when $P_A>\theta$, where $\theta$ is a predefined threshold, the user tagging module 86 may tag an electronic representation of the user 40 as a permissioned user for performing the at least one operation in the computer environment. When $P_A<\theta$, the user tagging module 86 may tag an electronic representation of the user 40 as a non-permissioned violator user (e.g., a fraudster) and the user 40 may be blocked from performing the at least one operation in the computer environment.

In some embodiments, the permission message generator module 76 may keep sending permission messages to the user 40 until the user tagging module 86 may assess that $P_A>\theta$ or $P_A<\theta$, or the user tagging module 86 may assess $P_A$ relative to any suitable combination of multiple predefined thresholds.

In some embodiments, the probability associated with each edge may be determined by how frequently the user transitioned into an acceptable state compared to that of the at least one other user. For example, if there are 100 users that may be identified from operations in the data operations database 88 as taking vacations, where 50 users travelled to France, 20 users travelled to Spain, and 30 travelled to Italy. Thus, $P_1$ in the example shown in FIG. 4 may be $P_1=0.2$. Stated differently, the processor 55 may be further configured to compute the probability based on a number of occurrences that the user transitions into operation-type centric nodes in the graph database associated with the at least one operation type performed by the user compared to operation-type centric nodes associated with the at least one operation type performed by the at least one other user.

The embodiments shown in FIGS. 1-5 are merely for conceptual clarity and not by way of limitation of the embodiments of the present disclosure. Any definition of probability may be used, for example, such as a probability that the at least one other user from the plurality of users previously performed operations for any of the at least one operation type associated with the at least one data attribute between adjacent operation-type centric nodes. Thus, a higher accumulated probability in this case would be indicative of a fraudster. For the use case of a data center, the user may be asked questions related to previous operations performed by the user in the data center computer environment and when these previous operations were performed, such as downloading and/or uploading files from computer environment, monitoring actions of other users using the data center, for example.

In some embodiments, the probability of permissioned user module 80 may compute the accumulated probability using a machine learning model, such as a Hidden Markov model (HMM). The Hidden Markov model may be stored in the graph database, where the hidden states of the HMM are the permissioned user and the non-permissioned violator user. An observation of the HMM may be the permission respond message. The Hidden Markov model may use a Viterbi algorithm to tag the user.

Figure 5:
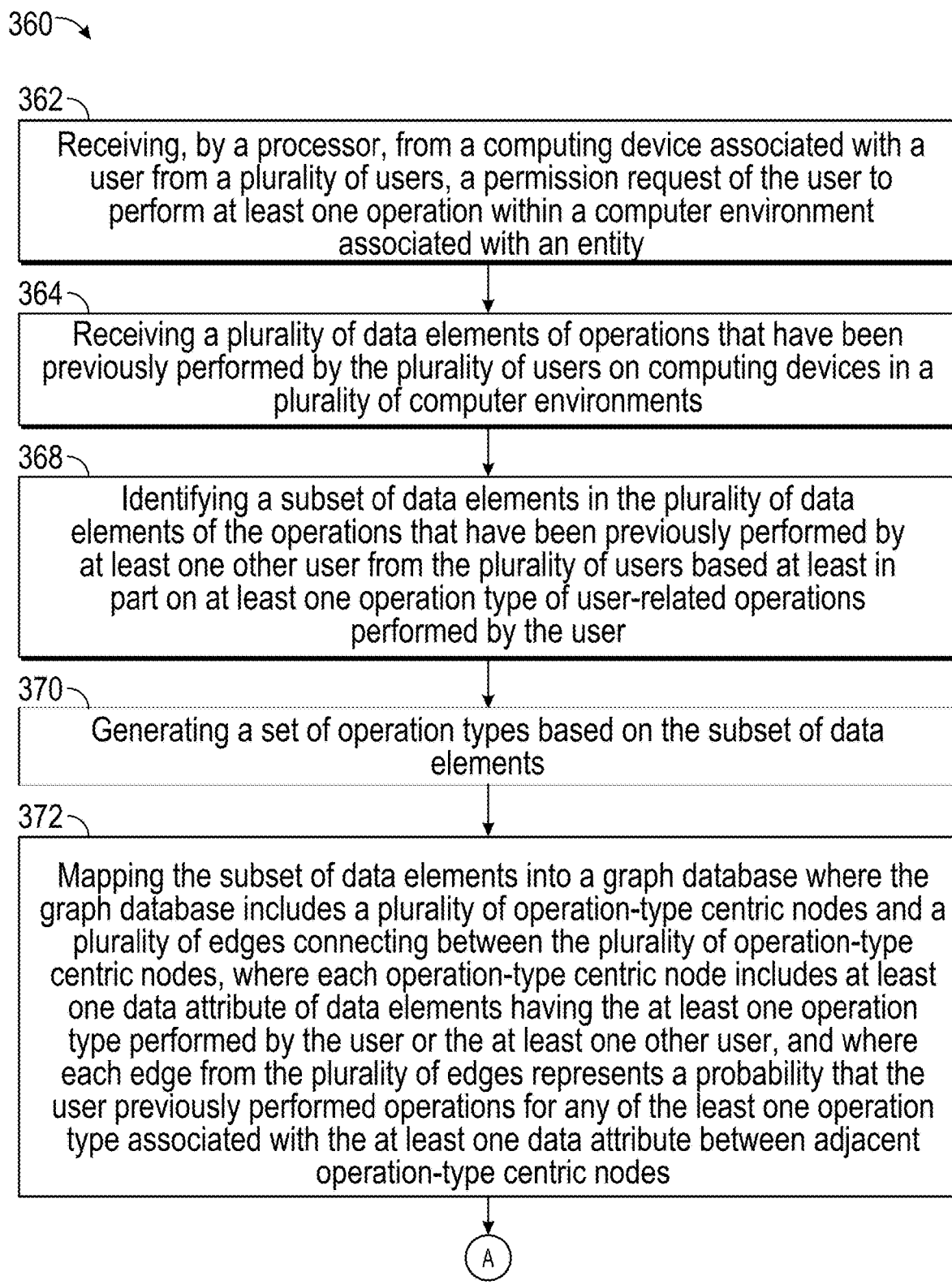
FIG. 5 illustrates a flowchart of a method for managing permission messages in a database in accordance with one or more embodiments of the present disclosure.
Figure 5:
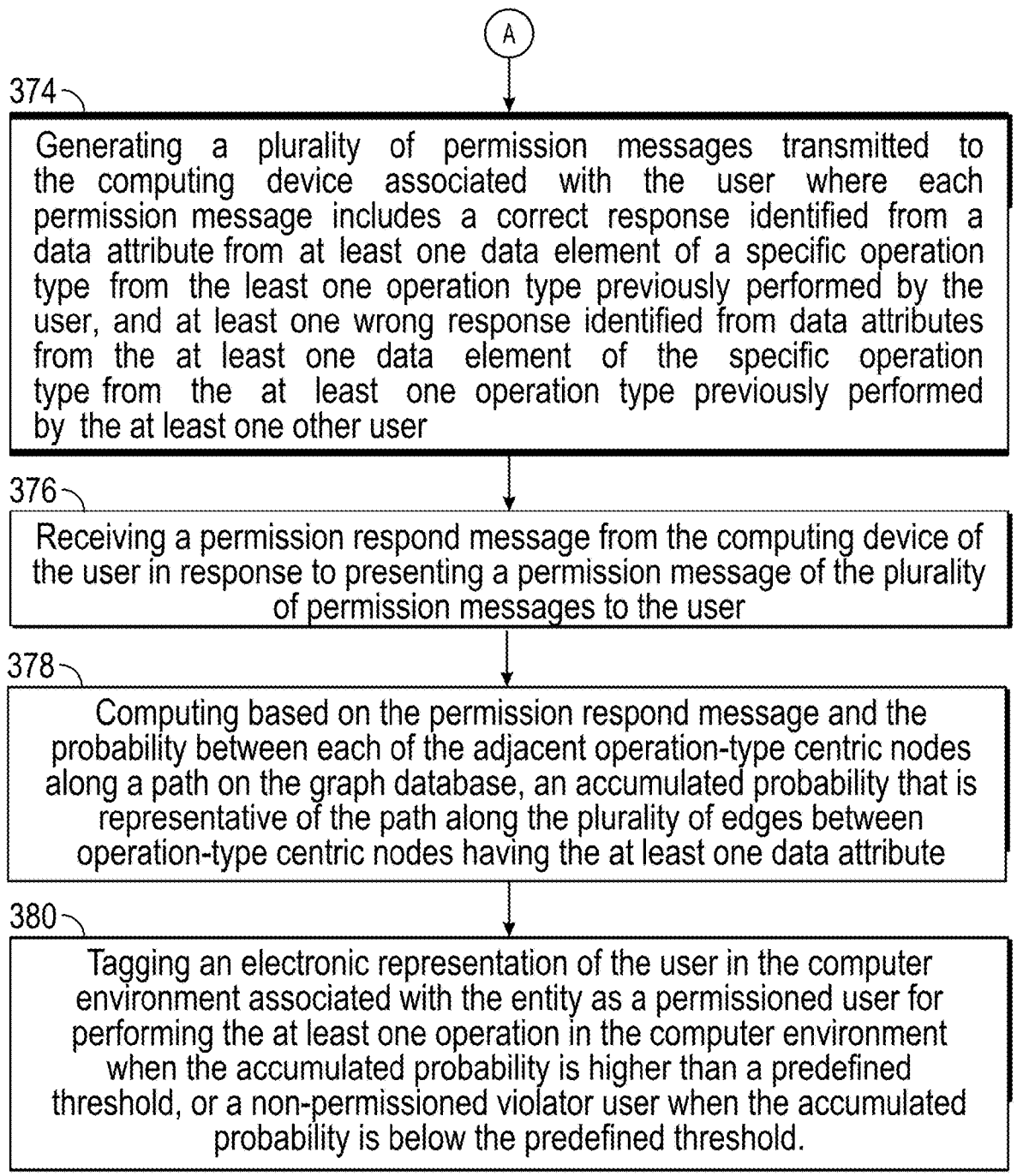

FIG. 5 illustrates a flowchart of a method 360 for managing permission messages in a database in accordance with one or more embodiments of the present disclosure. Method 360 may be performed by the processor 55 of the server 15.

The method 360 may include receiving 362, by the processor 55 of the server 15, from a computing device 45 associated with a user 40 from a plurality of users, a permission request of the user to perform at least one operation within a computer environment associated with an entity. In some embodiments, the computer environment may be any of the N computers (e.g., Computer1 20A . . . ComputerN 20B) as shown in FIG. 1. In other embodiments, the computer environment may be the server 15 by itself.

The method 360 may include receiving 364 a plurality of data elements of operations that have been previously performed by the plurality of users on computing devices in a plurality of computer environments.

The method 360 may include identifying 368 a subset of data elements in the plurality of data elements of the operations that have been previously performed by at least one other user from the plurality of users based at least in part on at least one operation type of user-related operations performed by the user.

The method 360 may include generating 370 a set of operation types based on the subset of data elements.

The method 360 may include mapping 372 the subset of data elements into a graph database where the graph database includes a plurality of operation-type centric nodes and a plurality of edges connecting between the plurality of operation-type centric nodes, where each operation-type centric node includes at least one data attribute of data elements having the at least one operation type performed by the user or the at least one other user, and where each edge from the plurality of edges represents a probability that the user previously performed operations for any of the at least one operation type associated with the at least one data attribute between adjacent operation-type centric nodes.

The method 360 may include generating 374 a plurality of permission messages transmitted to the computing device associated with the user where each permission message includes a correct response identified from a data attribute from at least one data element of a specific operation type from the at least one operation type previously performed by the user, and at least one wrong response identified from data attributes from the at least one data element of the specific operation type from the at least one operation type previously performed by the at least one other user.

The method 360 may include receiving 376 a permission respond message from the computing device of the user in response to presenting a permission message of the plurality of permission messages to the user.

The method 360 may include computing 378 based on the permission respond message and the probability between each of the adjacent operation-type centric nodes along a path on the graph database, an accumulated probability that is representative of the path along the plurality of edges between operation-type centric nodes having the at least one data attribute.

The method 360 may include tagging 380 an electronic representation of the user in the computer environment associated with the entity as a permissioned user for performing the at least one operation in the computer environment when the accumulated probability is higher than a predefined threshold, or a non-permissioned violator user when the accumulated probability is below the predefined threshold.

In some embodiments, the subset of data elements in the plurality of data elements of the operations may include data elements of operations that have been previously performed by the user from the plurality of users and the at least one other user from the plurality of users based at least in part on at least one operation type of user-related operations performed by the user.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, C DMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
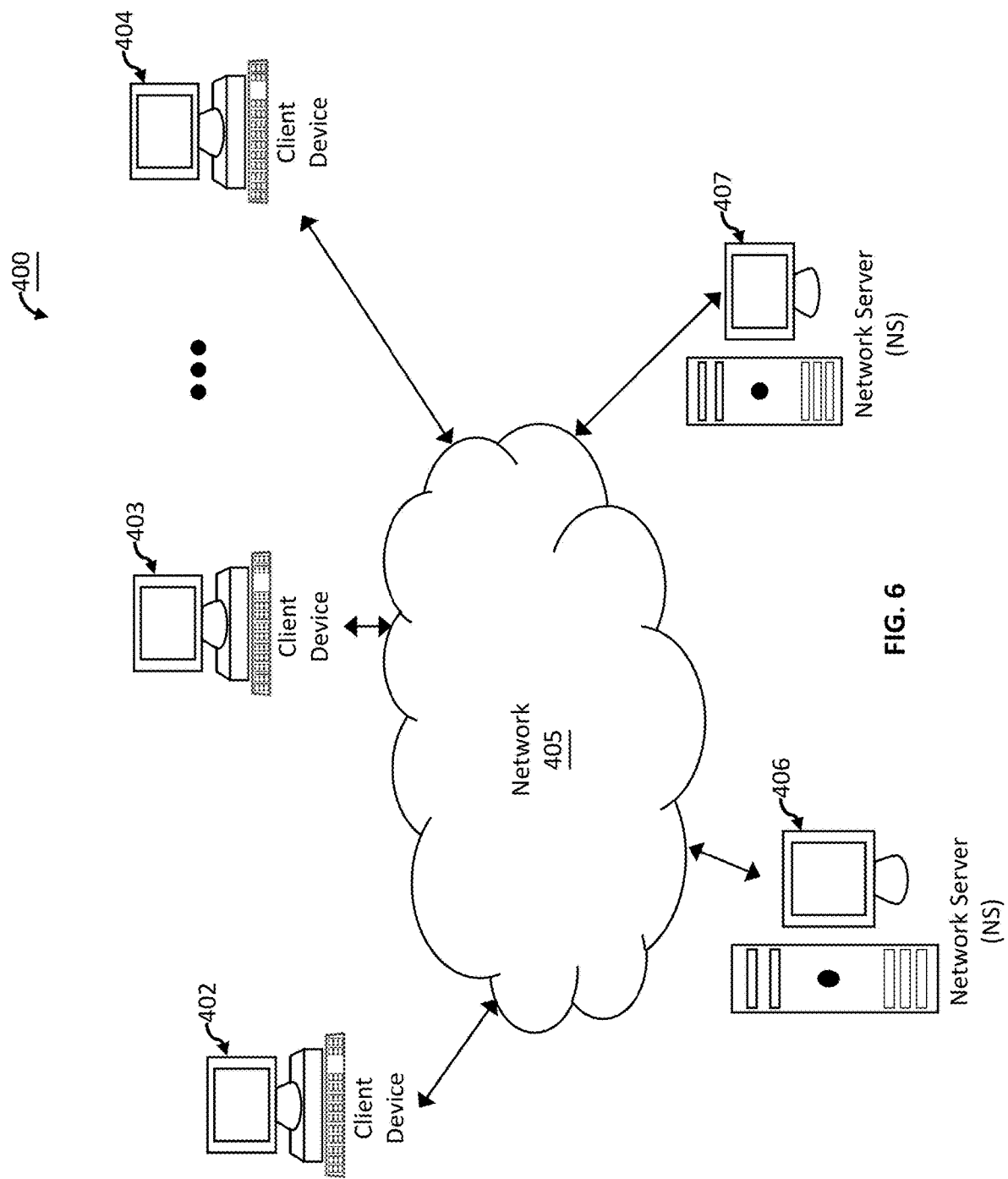
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
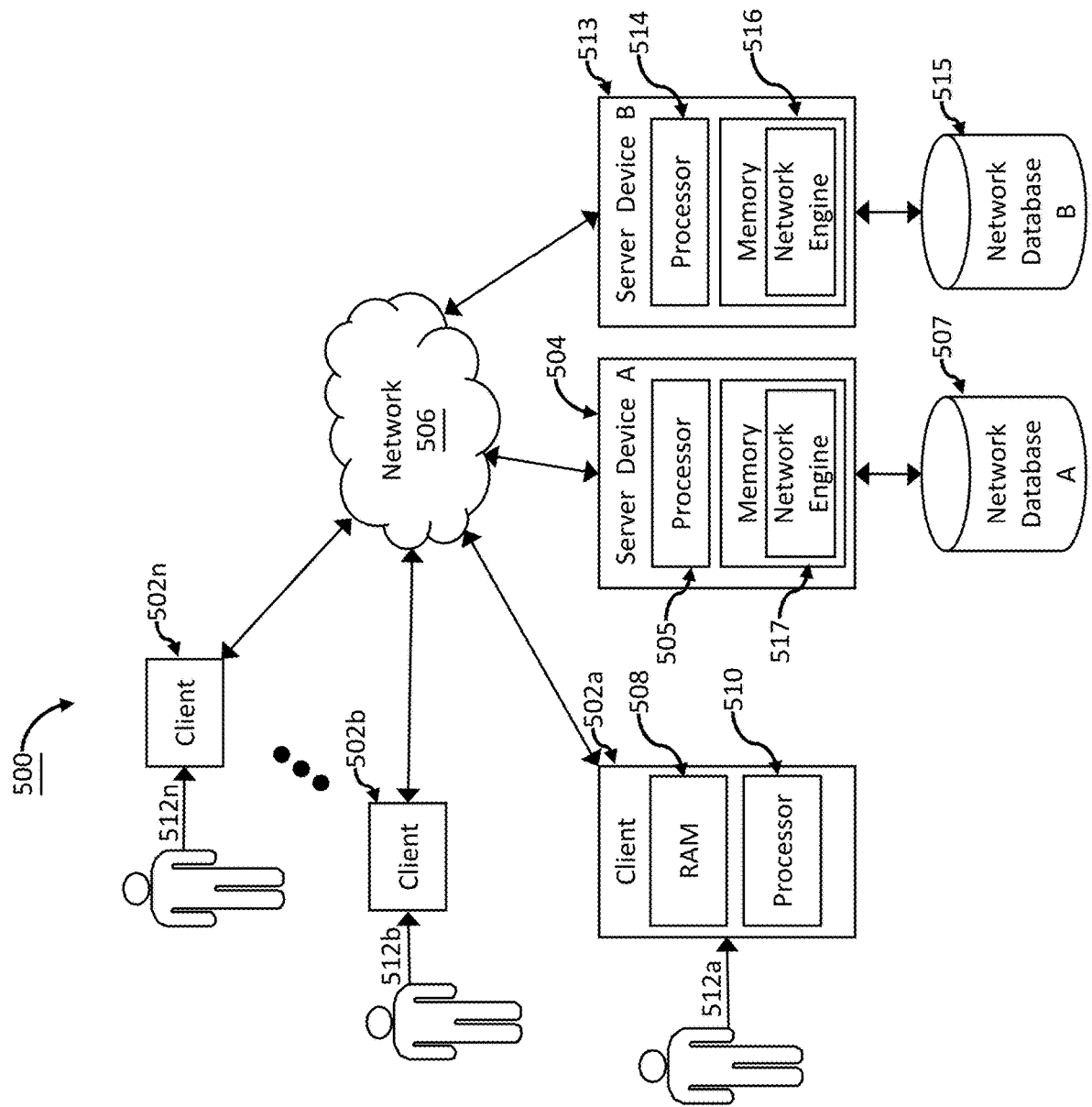
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
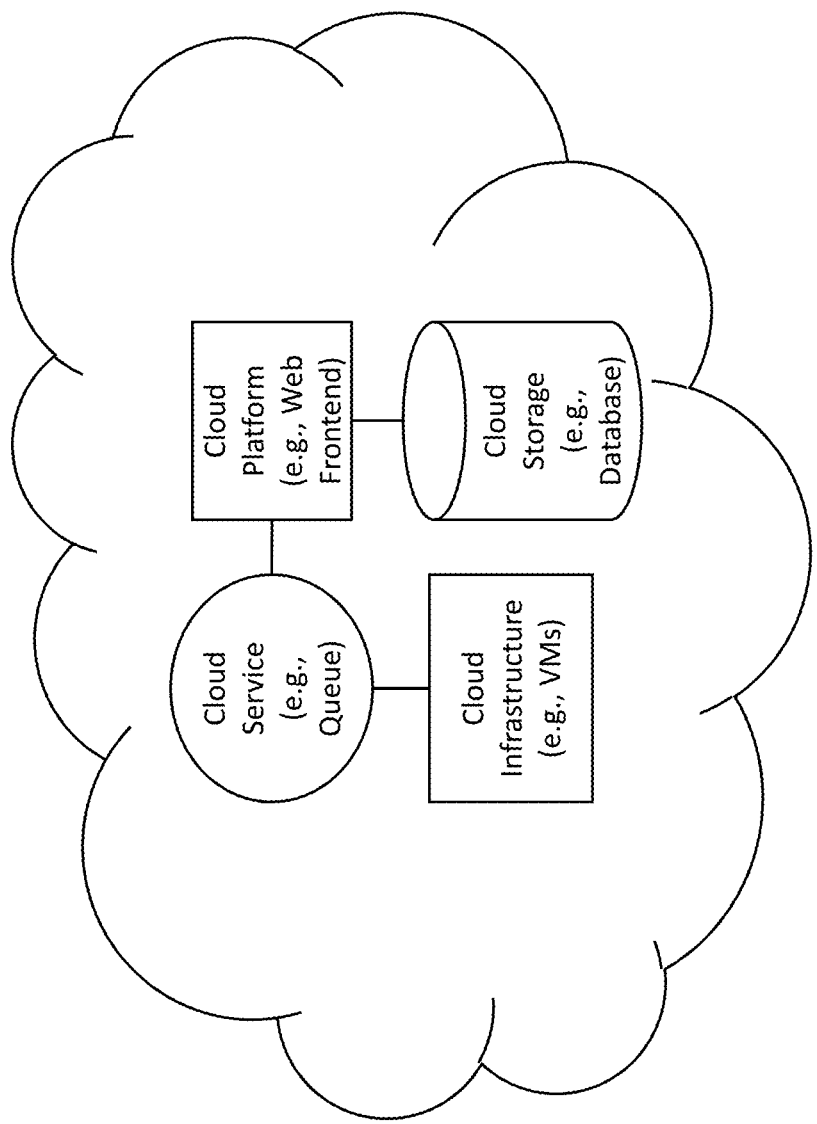
FIGS. 8 and 9 are diagrams illustrating implementations of cloud computing architecture/aspects with respect to which the disclosed technology may be specifically configured to operate, in accordance with one or more embodiments of the present disclosure.
Figure 9:
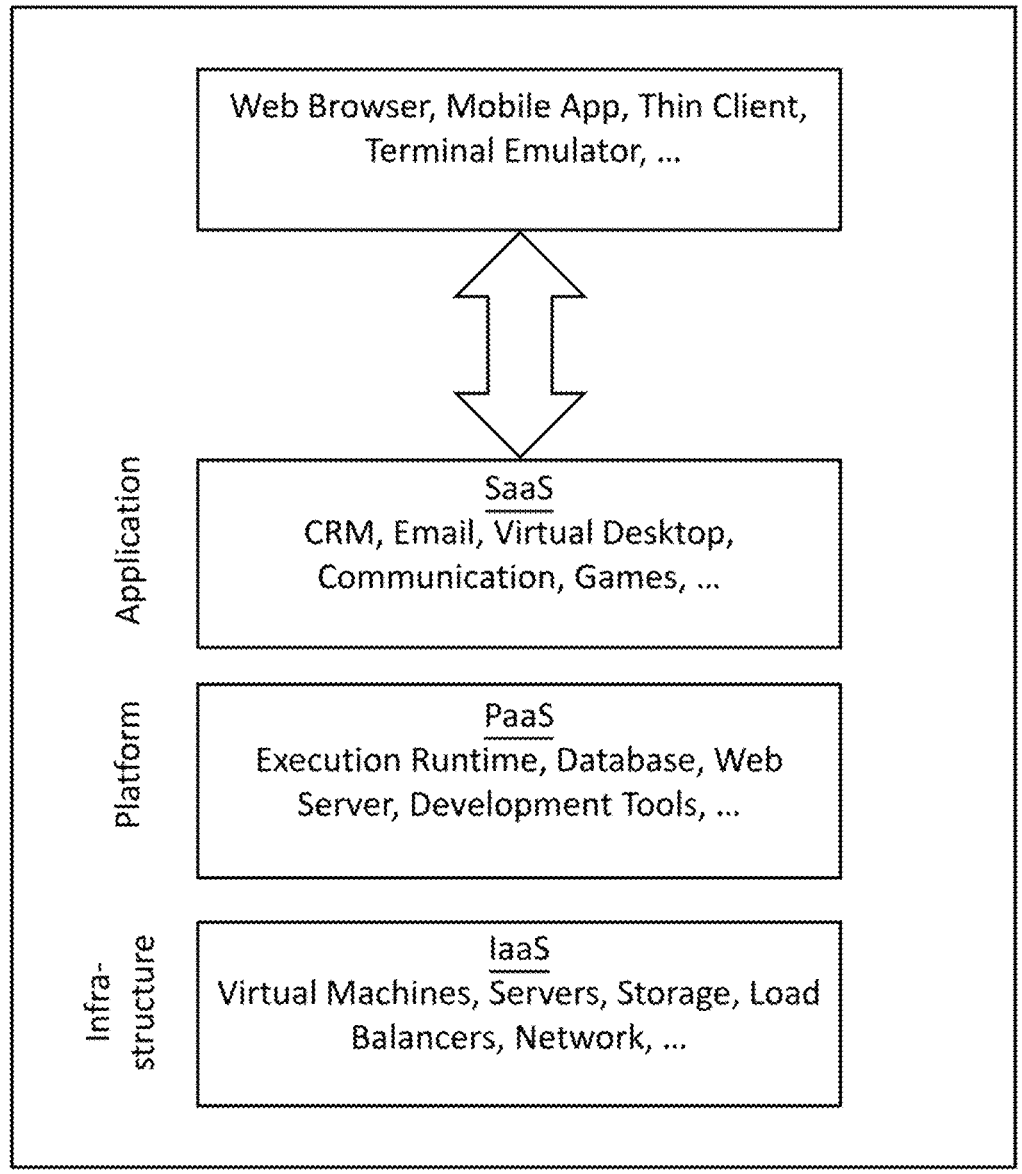

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
    receiving, by a processor, from a computing device associated with a user from a plurality of users, a permission request of the user to perform at least one operation within a computer environment associated with an entity;
    receiving, by the processor, a plurality of data elements of operations that have been previously performed by the plurality of users on computing devices in a plurality of computer environments;
    identifying, by the processor, a subset of data elements in the plurality of data elements of the operations that have been previously performed by at least one other user from the plurality of users based at least in part on at least one operation type of user-related operations performed by the user;
    generating, by the processor, a set of operation types based on the subset of data elements;
    mapping, by the processor, the subset of data elements into a graph database;
      where the graph database may include a plurality of operation-type centric nodes and a plurality of edges connecting between the plurality of operation-type centric nodes;
      where each operation-type centric node may include at least one data attribute of data elements having the at least one operation type performed by the user or the at least one other user;
      where each edge from the plurality of edges may represent a probability that the user previously performed operations for any of the at least one operation type associated with the at least one data attribute between adjacent operation-type centric nodes;

generating, by the processor, a plurality of permission messages transmitted to the computing device associated with the user;

where each permission message may include:

(i) a correct response identified from a data attribute from at least one data element of a specific operation type from the at least one operation type previously performed by the user, and (ii) at least one wrong response identified from data attributes from the at least one data element of the specific operation type from the at least one operation type previously performed by the at least one other user;

receiving, by the processor, a permission respond message from the computing device of the user in response to presenting a permission message of the plurality of permission messages to the user;

computing, by the processor, based on the permission respond message and the probability between each of the adjacent operation-type centric nodes along a path on the graph database, an accumulated probability that is representative of the path along the plurality of edges between operation-type centric nodes having the at least one data attribute; and tagging, by the processor, an electronic representation of the user in the computer environment associated with the entity as:

(i) a permissioned user for performing the at least one operation in the computer environment when the accumulated probability is higher than a predefined threshold, or (i) a non-permissioned violator user when the accumulated probability is below the predefined threshold.

2. The method according to clause 1, where computing the accumulated probability may include using a machine learning model.

3. The method according as in any of clauses 1-2, where the machine learning model is a Hidden Markov model (HMM).

4. The method according to clause 3:

where hidden states of the HMM are the permissioned user and the non-permissioned violator user;

where an observation of the HMM are the permission respond message; and where the HMM uses a Viterbi algorithm to tag the user.

5. The method as in any of clauses 1-3, may further include computing, by the processor, the probability based on a number of occurrences that the user from the plurality of users transitions into operation-type centric nodes in the graph database associated with the at least one operation type performed by the user compared to operation-type centric nodes associated with the at least one operation type performed by the at least one other user.

6. The method as in any of clauses 1-3 or 5, where the generating the set of operation types based on the subset of data elements of operations may include applying a data cleaning pipeline, a rules engine, or both to the plurality of data elements of operations previously performed by the plurality of users.

7. The method as in any of clauses 1-3 or 5-6, where receiving the plurality of data elements of operations previously performed by the plurality of users may include receiving the plurality of data elements of operations previously performed by the plurality of users within a predefined historical time interval.

8. The method as in any of clauses 1-3 or 5-7, where the plurality of data elements of operations previously performed by the plurality of users may include a plurality of payment card transactions previously performed by a plurality of customers.

9. The method as in any of clauses 1-3 or 5-8, where the at least one operation type comprises at least one payment card transaction type.

10. The method as in any of clauses 1-3 or 5-9, where the entity may be a merchant, or a retail store.

11. A server may include a memory and a processor. The processor may be configured to execute computer code stored in the memory that causes the processor to:

receive, from a computing device associated with a user from a plurality of users, a permission request of the user to perform at least one operation within a computer environment associated with an entity;

receive a plurality of data elements of operations that have been previously performed by the plurality of users on computing devices in a plurality of computer environments;

identify a subset of data elements in the plurality of data elements of the operations that have been previously performed by at least one other user from the plurality of users based at least in part on at least one operation type of user-related operations performed by the user;

generate a set of operation types based on the subset of data elements;

map the subset of data elements into a graph database;

where the graph database may include a plurality of operation-type centric nodes and a plurality of edges connecting between the plurality of operation-type centric nodes;

where each operation-type centric node may include at least one data attribute of data elements having the at least one operation type performed by the user or the at least one other user;

where each edge from the plurality of edges may represent a probability that the user previously performed operations for any of the at least one operation type associated with the at least one data attribute between adjacent operation-type centric nodes;

generate a plurality of permission messages transmitted to the computing device associated with the user;

where each permission message may include:

(i) a correct response identified from a data attribute from at least one data element of a specific operation type from the at least one operation type previously performed by the user, and (ii) at least one wrong response identified from data attributes from the at least one data element of the specific operation type from the at least one operation type previously performed by the at least one other user;

receive a permission respond message from the computing device of the user in response to presenting a permission message of the plurality of permission messages to the user;

compute, based on the permission respond message and the probability between each of the adjacent operation-type centric nodes along a path on the graph database, an accumulated probability that is representative of the path along the plurality of edges between operation-type centric nodes having the at least one data attribute; and tag an electronic representation of the user in the computer environment associated with the entity as:
(i) a permissioned user for performing the at least one operation in the computer environment when the accumulated probability is higher than a predefined threshold, or
(i) a non-permissioned violator user when the accumulated probability is below the predefined threshold.

12. The server according to clause 11, where the processor may be configured to compute the accumulated probability by using a machine learning model.

13. The server as in any of clauses 11-12, where the machine learning model is a Hidden Markov model (HMM).

14. The server according to clause 13:
where hidden states of the HMM are the permissioned user and the non-permissioned violator user;
where an observation of the HMM are the permission respond message; and
where the HMM uses a Viterbi algorithm to tag the user.

15. The server as in any of clauses 11-12 or 14, where the processor may be further configured to compute the probability based on a number of occurrences that the user from the plurality of users transitions into operation-type centric nodes in the graph database associated with the at least one operation type performed by the user compared to operation-type centric nodes associated with the at least one operation type performed by the at least one other user.

16. The server as in any of clauses 11-12 or 14-15, where the processor may be configured to generate the set of operation types based on the subset of data elements of operations by applying a data cleaning pipeline, a rules engine, or both to the plurality of data elements of operations previously performed by the plurality of users.

17. The server as in any of clauses 11-12 or 14-16, where the processor may be configured to receive the plurality of data elements of operations previously performed by the plurality of users by receiving the plurality of data elements of operations previously performed by the plurality of users within a predefined historical time interval.

18. The server as in any of clauses 11-12 or 14-17, where the plurality of data elements of operations previously performed by the plurality of users may include a plurality of payment card transactions previously performed by a plurality of customers.

19. The server as in any of clauses 11-12 or 14-18, where the at least one operation type comprises at least one payment card transaction type.

20. The server as in any of clauses 11-12 or 14-19, where the entity may be a merchant, or a retail store.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method comprising:
receiving, by at least one processor, at least one permission request from at least one permission-requesting user of a plurality of users to perform at least one operation on at least one terminal of at least one computer from a plurality of computers within a computer environment associated with at least one entity;
identifying, by the at least one processor, based at least in part on at least one operation type of the at least one operation to be performed by the at least one permission-requesting user from the plurality of users, a subset of data elements in a plurality of data elements of operations having the at least one operation type that have been previously performed by at least one other user from the plurality of users;
mapping, by the at least one processor, the subset of data elements into a graph database;
wherein the graph database comprises a plurality of operation-type centric nodes and a plurality of user-centric probability edges connecting between the plurality of operation-type centric nodes;
wherein each operation-type centric node comprises at least one data attribute of data elements having the at least one operation type performed by the at least one permission-requesting user or the at least one other user;
wherein each user-centric probability edge from the plurality of user-centric probability edges represents a probability that the at least one permission-requesting user previously performed operations for any of the at least one operation type associated with the at least one data attribute between adjacent operation-type centric nodes;
receiving, by the at least one processor, a plurality of permission response messages from at least one computing device associated with the at least one permission-requesting user in response to presenting a plurality of permission messages to the at least one permission-requesting user on a graphic user interface display on the at least one computing device, the at least one terminal, or any combination thereof;
wherein each permission message comprises:
a correct response identified from a data attribute from at least one data element of a specific operation type from the at least one operation type previously performed by the at least one permission-requesting user, and
at least one wrong response identified from data attributes from the at least one data element of the specific operation type from the at least one operation type previously performed by the at least one other user;
determining, by the at least one processor, a permission response path in the graph database based on the plurality of permission response messages to the plurality of permission messages along the plurality of user-centric probability edges between operation-type centric nodes having the at least one data attribute; and
generating, by the at least one processor, based on the permission response path, at least one computer command that causes the at least one computer to:

allow the at least one permission-requesting user to perform the at least one operation on the at least one terminal, or block the at least one permission-requesting user to perform the at least one operation on the at least one terminal.

2. The method according to claim 1, wherein the determining of the permission response path in the graph database comprises determining an accumulated probability using a machine learning model.

3. The method according to claim 2, wherein the machine learning model is a Hidden Markov model (HMM).

4. The method according to claim 3, further comprising determining, by the at least one processor, using the accumulated probability that the at least one permission-requesting user is at least one permissioned user or at least one non-permissioned violator user;

wherein hidden states of the HMM are the at least one permissioned user and the at least one non-permissioned violator user;

wherein an observation of the HMM is a permission response message from the plurality of permission response messages; and wherein the HMM uses a Viterbi algorithm to tag the at least one permission-requesting user.

5. The method according to claim 1, further comprising computing, by the at least one processor, the probability based on a number of occurrences that the at least one permission-requesting user from the plurality of users transitions into the operation-type centric nodes in the graph database associated with the at least one operation type performed by the at least one permission-requesting user compared to the operation-type centric nodes associated with the at least one operation type performed by the at least one other user.

6. The method according to claim 1, further comprising generating, by the at least one processor, a set of operation types based on the subset of data elements by applying a data cleaning pipeline, a rules engine, or both to the plurality of data elements of the operations previously performed by the plurality of users.

7. The method according to claim 1, further comprising receiving, by the at least one processor, the plurality of data elements of operations that have been previously performed by the plurality of users within a predefined historical time interval on computing devices associated with the plurality of users.

8. The method according to claim 1, wherein the plurality of data elements of the operations previously performed by the plurality of users comprise a plurality of payment card transactions previously performed by a plurality of customers.

9. The method according to claim 1, wherein the at least one operation type comprises at least one payment card transaction type.

10. The method according to claim 1, wherein the at least one entity is a merchant, or a retail store.

11. A system, comprising:

at least one non-transitory memory; and at least one processor configured to execute computer code stored in the at least one non-transitory memory that causes the at least one processor to:

receive at least one permission request from at least one permission-requesting user of a plurality of users to perform at least one operation on at least one terminal of at least one computer from a plurality of computers within a computer environment associated with at least one entity;

identify based at least in part on at least one operation type of the at least one operation to be performed by the at least one permission-requesting user from the plurality of users, a subset of data elements in a plurality of data elements of operations having the at least one operation type that have been previously performed by at least one other user from the plurality of users;

map the subset of data elements into a graph database;

wherein the graph database comprises a plurality of operation-type centric nodes and a plurality of user-centric probability edges connecting between the plurality of operation-type centric nodes;

wherein each operation-type centric node comprises at least one data attribute of data elements having the at least one operation type performed by the at least one permission-requesting user or the at least one other user;

wherein each user-centric probability edge from the plurality of user-centric probability edges represents a probability that the at least one permission-requesting user previously performed operations for any of the at least one operation type associated with the at least one data attribute between adjacent operation-type centric nodes;

receive a plurality of permission response messages from at least one computing device associated with the at least one permission-requesting user in response to presenting a plurality of permission messages to the at least one permission-requesting user on a graphic user interface display on the at least one computing device, the at least one terminal, or any combination thereof;

wherein each permission message comprises:

a correct response identified from a data attribute from at least one data element of a specific operation type from the at least one operation type previously performed by the at least one permission-requesting user, and at least one wrong response identified from data attributes from the at least one data element of the specific operation type from the at least one operation type previously performed by the at least one other user;

determine based on the plurality of permission response messages, a permission response path in the graph database based on the plurality of permission response messages to the plurality of permission messages along the plurality of user-centric probability edges between operation-type centric nodes having the at least one data attribute; and generate, based on the permission response path, at least one computer command that causes the at least one computer to:

allow the at least one permission-requesting user to perform the at least one operation on the at least one terminal, or block the at least one permission-requesting user to perform the at least one operation on the at least one terminal.

12. The system according to claim 11, wherein the at least one processor is configured to determine the permission response path in the graph database by computing an accumulated probability using a machine learning model.

13. The system according to claim 12, wherein the machine learning model is a Hidden Markov model (HMM).

14. The system according to claim 13, wherein the at least one processor is further configured to determine using the accumulated probability that the at least one permission-requesting user is at least one permissioned user or at least one non-permissioned violator user;
wherein hidden states of the HMM are the at least one permissioned user and the at least one non-permissioned violator user;
wherein an observation of the HMM is a permission response message from the plurality of permission response messages; and
wherein the HMM uses a Viterbi algorithm to tag the at least one permission-requesting user.

15. The system according to claim 11, wherein the at least one processor is further configured to compute the probability based on a number of occurrences that the at least one permission-requesting user from the plurality of users transitions into the operation-type centric nodes in the graph database associated with the at least one operation type performed by the at least one permission-requesting user compared to the operation-type centric nodes associated with the at least one operation type performed by the at least one other user.

16. The system according to claim 11, wherein the at least one processor is further configured to generate a set of operation types based on the subset of data elements by applying a data cleaning pipeline, a rules engine, or both to the plurality of data elements of the operations previously performed by the plurality of users.

17. The system according to claim 11, wherein the plurality of data elements of the operations previously performed by the plurality of users comprise a plurality of payment card transactions previously performed by a plurality of customers.

18. The system according to claim 11, wherein the at least one operation type comprises at least one payment card transaction type.

19. The system according to claim 11, wherein the at least one entity is a merchant, or a retail store.

20. A computer-based system, comprising:
providing a first computing means for receiving at least one permission request from at least one permission-requesting user of a plurality of users to perform at least one operation on at least one terminal of at least one computer from a plurality of computers within a computer environment associated with at least one entity:
providing a second computing means for identifying, based at least in part on at least one operation type of the at least one operation to be performed by the at least one permission-requesting user from the plurality of users, a subset of data elements in a plurality of data elements of operations having the at least one operation type that have been previously performed by at least one other user from the plurality of users;
providing a graph database means for mapping the subset of data elements into a graph database;
wherein the graph database comprises a plurality of operation-type centric nodes and a plurality of user-centric probability edges connecting between the plurality of operation-type centric nodes;
wherein each operation-type centric node comprises at least one data attribute of data elements having the at least one operation type performed by the at least one permission-requesting user from the plurality of users or the at least one other user;
wherein each user-centric probability edge from the plurality of user-centric probability edges represents a probability that the at least one permission-requesting user previously performed operations for any of the at least one operation type associated with the at least one data attribute between adjacent operation-type centric nodes;
providing a third computing means for receiving a plurality of permission response messages from at least one computing device associated with the at least one permission-requesting user in response to presenting a plurality of permission messages to the at least one permission-requesting user on a graphic user interface display on the at least one computing device, the at least one terminal, or any combination thereof;
wherein each permission message comprises:
a correct response identified from a data attribute from at least one data element of a specific operation type from the at least one operation type previously performed by the at least one permission-requesting user, and
at least one wrong response identified from data attributes from the at least one data element of the specific operation type from the at least one operation type previously performed by the at least one other user;
providing a fourth computing means for determining, based on the plurality of permission response messages, a permission response path in the graph database based on the plurality of permission response messages to the plurality of permission messages along the plurality of user-centric probability edges between operation-type centric nodes having the at least one data attribute; and
providing a fifth computing means for generating, based on the permission response path, at least one computer command that causes the at least one computer to:
allow the at least one permission-requesting user to performing the at least one operation on the at least one terminal, or
block the at least one permission-requesting user to perform the at least one operation on the at least one terminal.

* * * * *